Nov. 14, 1950     A. S. KOURI     2,530,015
TRELLIS
Filed March 20, 1948
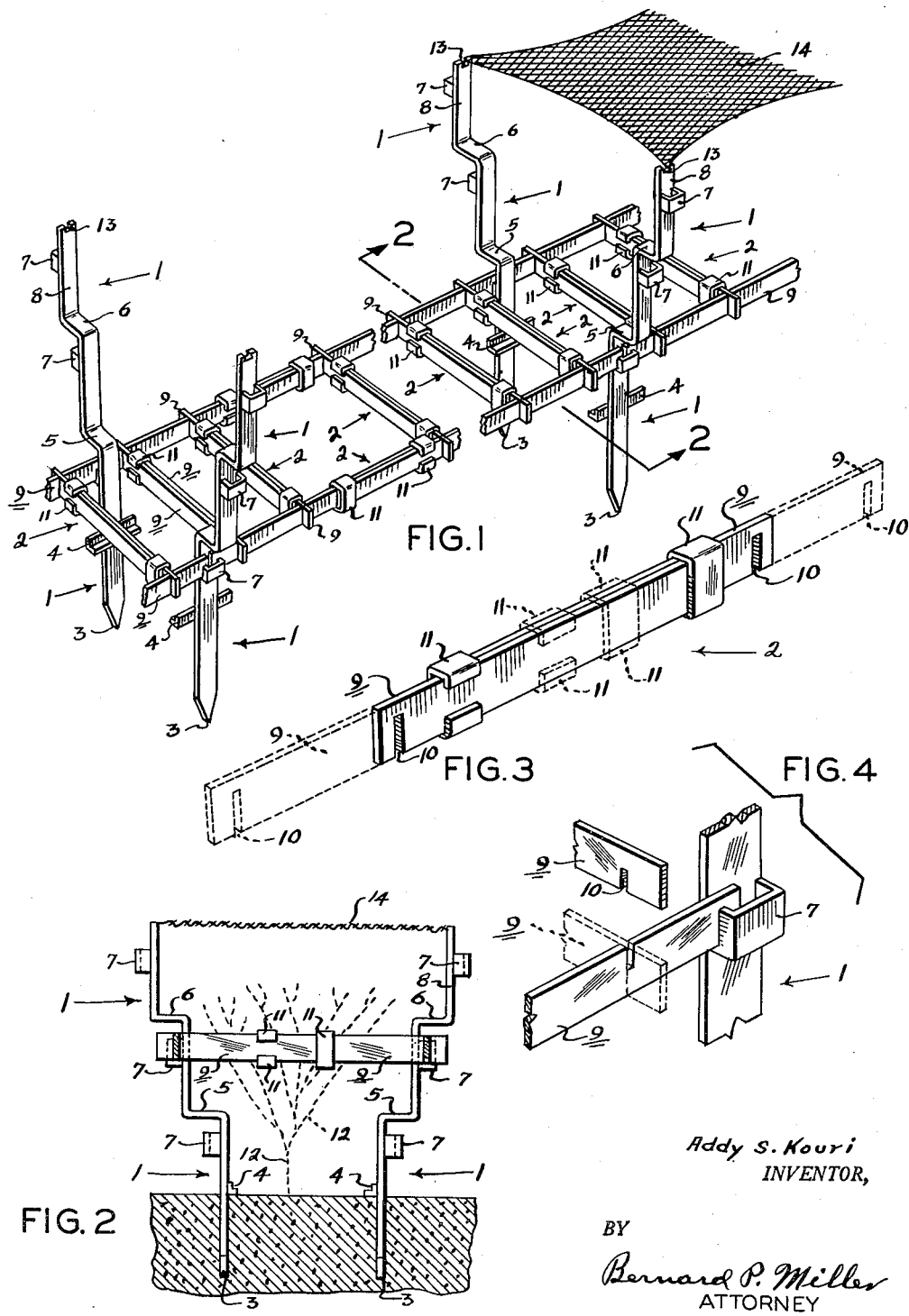

Patented Nov. 14, 1950

2,530,015

UNITED STATES PATENT OFFICE 2,530,015

TRELLIS

Addy S. Kouri, Oklahoma City, Okla.

Application March 20, 1948, Serial No. 16,121

2 Claims. (Cl. 47—46)

The present invention relates to trellises for supporting fruit growing plants such as berry vines, tomato plants, etc.

In gardening, including flower gardening, the limbs or branches of many plants must be artifically supported off the ground in order to obtain the best result or yield. Since such plants vary in type of growth and size at maturity, the various species often require a support of different height and width. For instance, a trellis for tomato plants is not suitable for raspberries.

It is common practice, each growing season, to erect wooden trellises for each particular crop of plant. Much material waste is therefore entailed each time it is desired to change the crop on a given plot of ground, because new trellises may well be required for the new plant crop.

The prime object of the present invention is to provide a plant supporting trellis which is adaptable to properly support various sizes and types of plants.

A further object is to provide a trellis which may be extended to any length, in order to accommodate plant rows of various lengths.

Another object is to provide a trellis assembly, the horizontal members of which may be varied in height.

An additional object is to provide a trellis which may be assembled by hand without the use of any tools.

A still further object is to provide a trellis made of interchangeable metal parts, yet which may be manufactured at a cost which is not prohibitive.

Other objects will be apparent from the following description when taken in conjunction with the accompanying single sheet of drawing, wherein:

Figure 1 is a perspective view of a trellis assembly which is constructed and assembled in accordance with the present invention;

Figure 2 is a vertical sectional view taken substantially along the line 2—2 of Fig. 1;

Figure 3 is a fragmentary perspective view of a longitudinally extensible member, a plurality of which form the horizontal portions of the trellis; and, Figure 4 is a fragmentary perspective view detailing the interlocking assembly of the horizontal and vertical members of the apparatus.

Like characters of reference designate like parts in those figures of the drawings in which they occur.

The trellis assembly of the present invention is made up of a plurality of identical legs which form the uprights for supporting a plurality of the extensible members of Fig. 3.

In the drawings:

The reference numeral 1 indicates, as a whole, one of the uprights or legs, and the numeral 2 indicates one of the horizontal longitudinally extensible members.

The legs 1 are each composed of a single piece of strap-iron having a point 3 formed at its lower end whereby it may be forced into the earth's surface. A cross-piece 4 is welded or otherwise firmly attached to each leg so that a person's foot may be used to force the leg into the ground. Each leg 1 is bent to form at least two horizontal shoulders 5 and 6 which are vertically spaced from each a desired distance.

Beneath each shoulder, the leg 1 is equipped with an outwardly projecting hollow ear or loop 7 which is welded to the leg, and which is open at its top and bottom. The leg 1 has an upper vertical portion 8 which extends a desired distance above the upper shoulder 6, and this portion 8 is also equipped with one of the ears 7.

The longitudinally extensible horizontal members 2 are each formed of two elongated strap-iron sections 9 which are identical to each other. Adjacent one end of each section 9, there is provided a notch 10 which is of a width slightly greater than the thickness of the section, and also slightly greater than the thickness of the material which forms the ears 7 on the legs 1. The other end of each section 9 is equipped with a rigidly mounted loop or ear 11 which is laterally wide enough to slidably receive another one of the sections 9.

The horizontal member 2 is formed by assembling two of the sections together in side by side relation as best illustrated in Fig. 3, so that the sections may slide longitudinally with relation to each other. This relative longitudinal movement is indicated by the dotted lines of Fig. 3.

In assembling a trellis out of a plurality of the legs 1 and horizontal members 2, the legs 1 are first forced into the ground so as to form a laterally aligned pair thereof (Fig. 2). The leg of each pair is located at one side of the plant row, and any desired number of such pairs may be thus formed along the row of plants.

The corresponding legs of two pairs, are next connected together by hooking the end notches 10 of the members 2 over one side of the lowermost loops 7 on the legs. The extensible members 2 thus form two sides for the trellis.

The next step in the assembly process is to anchor a desired plurality of the extensible members 2 between the trellis sides. This is done by merely hooking the notches 10 over the upper edges of the sides, as best shown in Fig. 1. The number of the laterally extending members 2 which are thus employed is optional, and may be governed by the nature of the plant crop to be supported by the trellis. One of the plants is illustrated in dotted lines in Fig. 2, and is indicated by the reference numeral 12.

The upper ends of the legs 1 are preferably provided with a suitable deformity 13 by which a net or other sun-shade 14 may be attached to the trellis.

It is pointed out that it is not absolutely essential that the shoulders 5 and 6 be horizontal, since they merely act as means for laterally off-setting the vertical portions of the legs 1.

It is further pointed out that, although not shown in the drawings, another assembly of the longitudinally extensible members 2 may be similarly provided on the legs 1 at the level of each set of the ears 7. Each horizontal assembly may be made of any desired length, and the lateral members are optional in number and may be selectively spaced.

It is not necessary that the sections 9 of the extensible members 2 be identical in length, since in some instances it may be found desirable to span greater distances than in others.

Obviously the invention is susceptible to some change or alteration without defeating its practicability, and I therefore do not wish to be confined to the preferred embodiment shown in the drawings and described herein, further than I am limited by the scope of the appended claims.

I claim:

1. In a knock-down trellis assembly, the combination of: a plurality of pointed legs adapted to be thrust into the earth's surface, each leg having a plurality of vertical portions which are off-set laterally, said legs adapted to be assembled in the ground in laterally spaced pairs, with the off-set portions of each pair uppermost and most remote from each other; a rigid outwardly extending loop of strap-like material carried by each of said vertical portions, with the edge of the material presented upwardly; longitudinally extensible horizontal strap-like side members extending between similar legs of a plurality of said pairs, said side members positioned on edge and being notched upwardly to removably engage the upper edges of said loops; and a plurality of longitudinally extensible horizontal strap-like cross-members positioned on edge and extending laterally between two of said side members, said cross-members removably connected solely to the side members, said side members and cross-members having complemental notches in their respective edges whereby the upper edges of all reside in a single plane when they are in assembled relation.

2. Structure as specified in claim 1, in which each of said longitudinally extensible members includes: two elongated sections lying side by side and movable longitudinally with relation to each other; and means for retaining said sections in their side by side slidable relationship.

ADDY S. KOURI.

REFERENCES CITED

The following references are of record in the file of this patent:

UNITED STATES PATENTS

| Number | Name | Date |
| --- | --- | --- |
| 601,438 | Ericksson | Mar. 29, 1898 |
| 948,604 | Caylor | Feb. 8, 1910 |
| 1,228,717 | Tataryn | June 5, 1917 |
| 1,586,213 | Nielsen | May 25, 1926 |